Jan. 31, 1967   M. S. JUHAS   3,301,363
COUNTER DRIVE CLUTCH MECHANISM
Filed Jan. 22, 1965   2 Sheets-Sheet 1
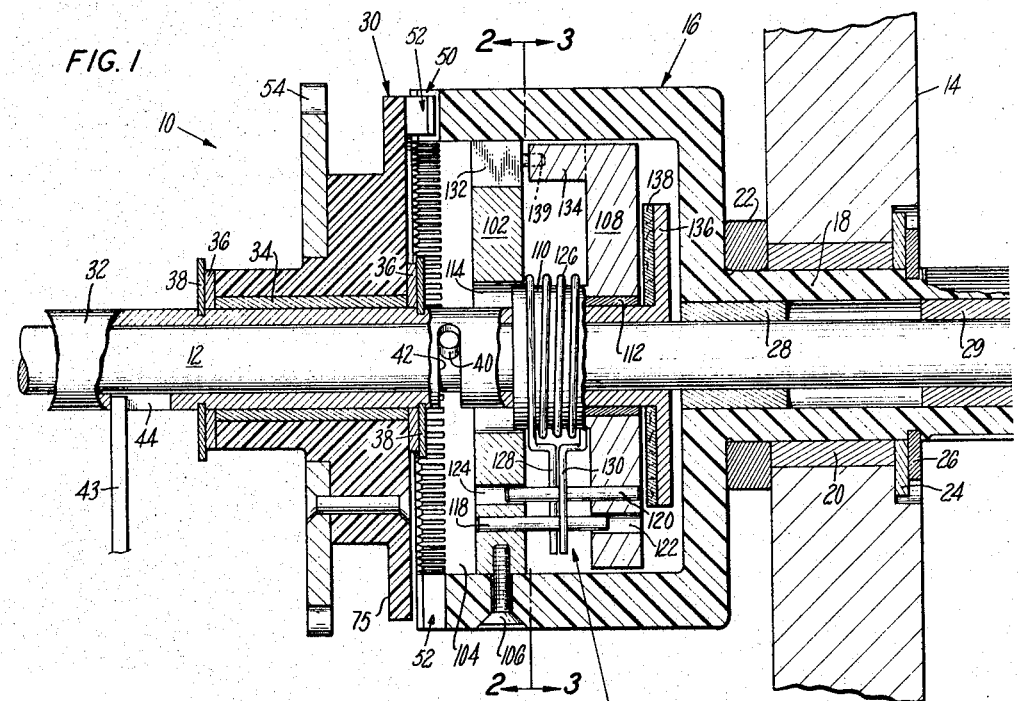
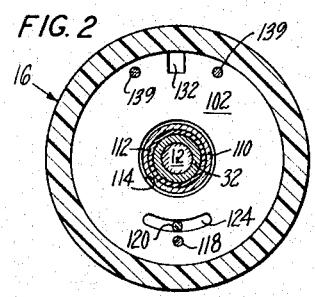
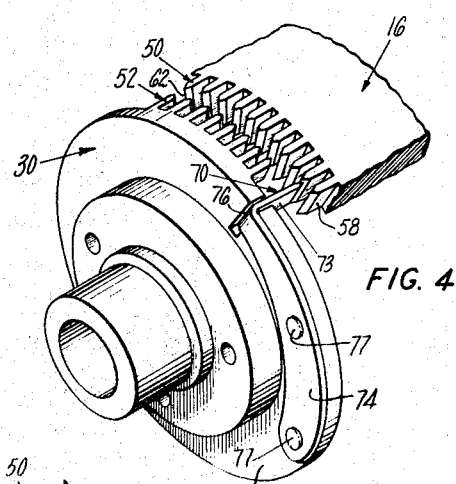
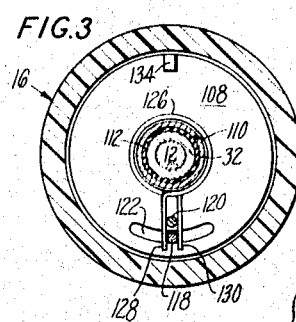
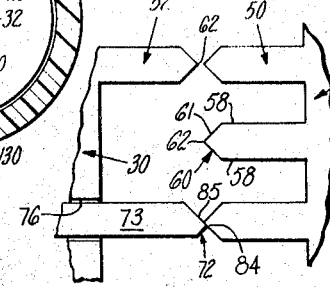
INVENTOR.
MICHAEL S. JUHAS
BY *Lindsey, Drutzman and Hayes*
ATTORNEYS

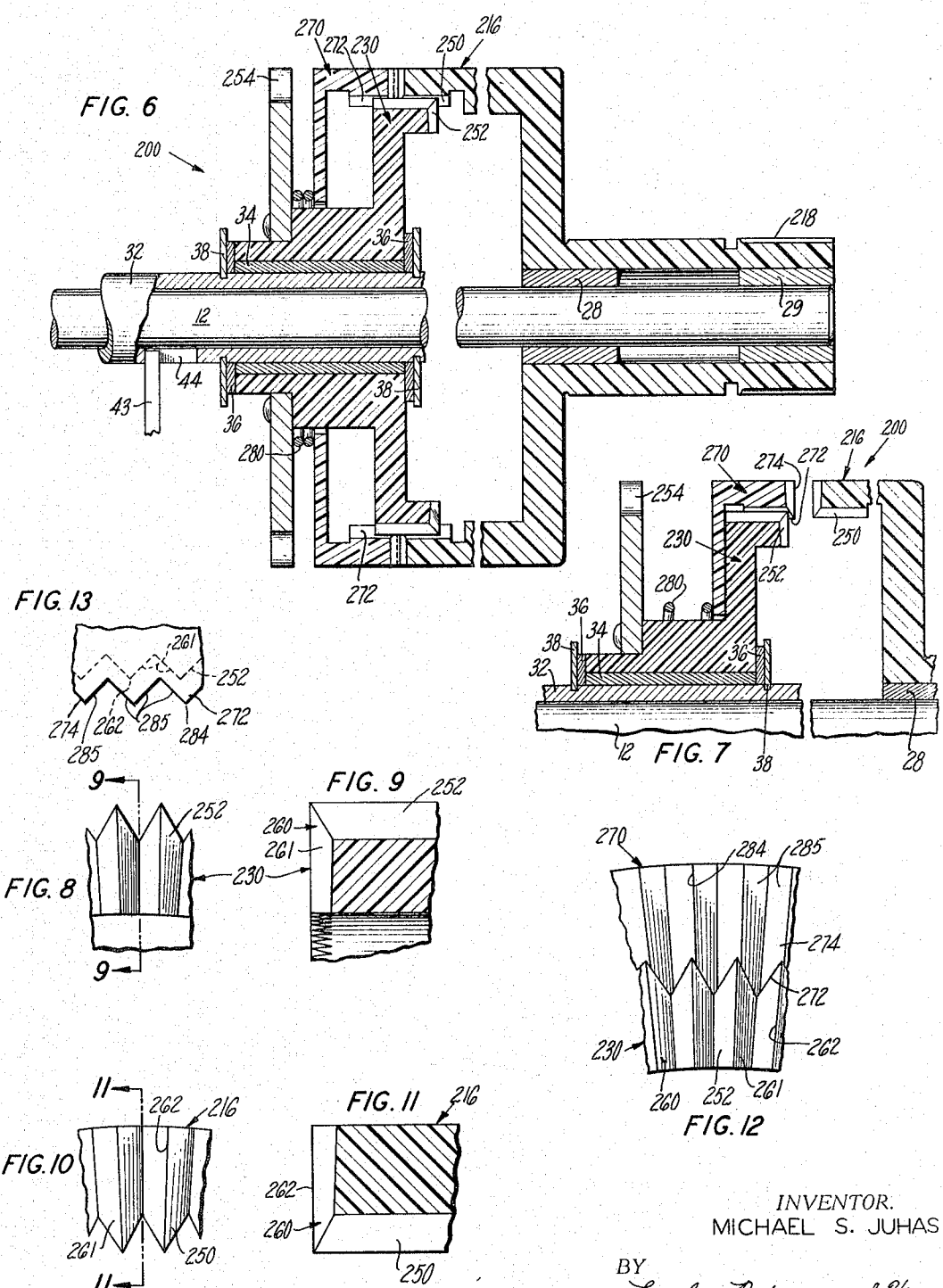

United States Patent Office 3,301,363
Patented Jan. 31, 1967

3,301,363
COUNTER DRIVE CLUTCH MECHANISM
Michael S. Juhas, Torrington, Conn., assignor to Veeder Industries Inc., a corporation of Connecticut
Filed Jan. 22, 1965, Ser. No. 427,238
12 Claims. (Cl. 192—67)

The present invention relates generally to counter drives and more particularly to a clutch mechanism in a counter-drive having particular utility for disconnecting the counter drive for resetting the counter.

It is a principal aim of the present invention to provide a new and improved clutch mechanism for a counter drive having angularly spaced teeth providing positive clutch engagement which may be smoothly engaged, and which has a small angular tooth pitch for reducing the relative angular displacement between the clutch elements that may be necessary for engagement of the clutch.

It is another aim of the present invention to provide a clutch mechanism for a counter drive having an interlock for preventing disengagement of the clutch while the counter is driven.

It is a further aim of the present invention to provide a clutch mechanism for a counter drive which is compatible with counters of the type having axially shiftable shafts for resetting the counter, which is adapted for being engaged and disengaged by the axially shiftable shaft in timely sequence with the resetting of the counter, and which prevents resetting the counter while the counter is driven.

It is another aim of the present invention to provide a new and useful positive drive fine-tooth clutch which may be smoothly engaged without dead center engagement of the opposing teeth of the clutch elements.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawings:

FIG. 1 is a generally longitudinal section view, partly broken away and partly in section, showing an embodiment of a clutch mechanism of the present invention fully engaged;

FIG. 2 is a reduced transverse section view taken substantially along line 2—2 of FIG. 1;

FIG. 3 is a reduced transverse section view taken substantially along line 3—3 of FIG. 1;

FIG. 4 is a reduced fragmentary perspective view, partly broken away and partly in section, showing the clutch mechanism of FIG. 1 disengaged;

FIG. 5 is an enlarged fragmentary longitudinal view of the clutch mechanism of FIG. 1 showing several of the clutch teeth thereof;

FIG. 6 is a generally longitudinal section view, partly broken away and partly in section, of another embodiment of a clutch mechanism of the present invention, showing the clutch mechanism fully engaged;

FIG. 7 is a fragmentary longitudinal section view showing the clutch mechanism of FIG. 6 disengaged;

FIG. 8 is an enlarged fragmentary end view of an inner clutch element of the clutch mechanism of FIG. 6;

FIG. 9 is a fragmentary longitudinal section view of the inner clutch element taken substantially along line 9—9 of FIG. 8;

FIG. 10 is an enlargetd fragmentary end view of an outer clutch element of the clutch mechanism of FIG. 6;

FIG. 11 is a fragmentary longitudinal section view of the outer clutch element taken substantially along line 11—11 of FIG. 10;

FIG. 12 is an enlarged fragmentary end view showing the inner clutch element and an outer auxiliary clutch element of the clutch mechanism of FIG. 6; and FIG. 13 is an enlarged fragmentary longitudinal view of the clutch mechanism of FIG. 6 showing several of the clutch teeth of the inner and auxiliary clutch elements.

Referring now to the drawings in detail wherein like numbers represent like parts, and in particular to the embodiment of the present invention shown in FIGS. 1–5, a clutch mechanism 10 is shown constructed for use in a counter drive of the type disclosed in my copending application Serial No. 384,104, filed July 21, 1964, now Pat. No. 3,244,368 and entitled Counter Reset Mechanism. For simplicity of explanation, therefore, the embodiment 10 of the clutch mechanism is shown mounted on a reset shaft 12 of the type which is adapted to be axially shifted for disengaging the counter and for being rotated for resetting the counter wheels as desecribed in the referenced copending application Serial No. 384,104. Also, for illustrative purposes the clutch mechanism 10 is shown mounted on a supporting plate 14 as, for example, the side of a counter housing and with a driving clutch element 16 of the clutch mechanism being provided with a hub 18 rotatably mounted within an opening in the plate 14 by a bushing 20 and retained against axial displacement by thrust washers 22, 24 and a locking ring 26. As in the forementioned copending application, the driving clutch element 16 is adapted to be driven as through a spur gear (not shown) mounted on the splined end of the hub 18 and is shown rotatably supporting the shaft 12 coaxially therewith by suitable bushings 28, 29 press-fit within a central bore within the hub 18.

A driven clutch element 30 is rotatably mounted coaxially with the drive clutch element 16 on a sleeve 32 rotatably receiving the shaft 12 and positioned intermediate the shaft and a bushing 34. The driven clutch element 30 is retained against axial displacement relative to the intermediate sleeve 32 by a pair of thrust washers 36 and a pair of locking rings 38, and the intermediate sleeve 32 is retained against axial displacement relative to the shaft 12 by a radially extending pin 40 fixed to the shaft 12 and received within a circumferentially extending slot 42 in the intermediate sleeve 32. The sleeve 32 is retained against rotation as by a stationary key 43 received within an axially extending slot 44 in the sleeve. This arrangement thereby provides for angular displacement of the shaft 12 sufficient to reset the counter wheels of a counting device as in the aforementioned application. And, by axially shifting the shaft 12, the driven clutch element 30 is axially displaced or shifted relative to the driving clutch element 16 for engaging and disengaging the coacting clutch teeth 50, 52 of the driving and driven clutch elements 16, 30, respectively. The driven clutch element 30 is shown provided with a spur gear 54 for driving the lowest order counter wheel of a counter as in the aforementioned application Ser. No. 384,104, and the clutch mechanism 10 is thereby adapted for engaging and disengaging the counter drive by axial displacement of the shaft 12.

With a positive drive or nonslip clutch of the type shown having angularly spaced coacting clutch teeth 50, 52, the angular pitch of the teeth is determinitive of the maximum relative angular displacement between the clutch elements which may be necessary to align the clutch elements for engagement of the clutch. When the drive train to the counter is completed by re-engagement of the clutch elements 16, 30, a counter error results which is proportional to the amount of the relative angular displacement between the clutch elements. It is therefore desirable to minimize the angular error brought about by the re-engagement of the clutch by reducing the angular pitch of the clutch teeth. For example, a positive clutch with one hundred teeth and therefore with an angular tooth pitch of 3.6° (360°÷100) is considered to be satisfactory in most counter drive mechanisms. Such, of course, necessitates the use of very fine teeth and, for example, with one hundred teeth and a pitch circle diameter of one inch the tooth pitch would be 0.0314".

The clutch mechanism of FIG. 1 is provided with a fine-tooth clutch with the drive clutch element 16 having clutch teeth 50 about its entire periphery, with the driven clutch element 30 having a tooth sector, and with the coacting clutch teeth 50, 52 being substantially identically formed with planar radial sides 58 and opposed leading edges 60 of generally V-shaped cross section with radially extending apexes 62. Accordingly, on re-engagement of the clutch elements 16, 30, the axially inclined or tapered leading edge portions 61 of the leading edges 60 function to cam the clutch teeth into coacting association. Notwithstanding this camming action by the tapered edge portions 61, dead center engagement of the apexes 62 could prevent smooth re-engagement of the clutch elements. Accordingly, one of the clutch elements 16, 30, here the clutch element 30, is provided with an auxiliary tooth 70 having a leading edge 72 which extends beyond the leading edges of the teeth 52 and is thereby adapted to engage the leading edges of the teeth 50 prior to the engagement therewith by the leading edges of the clutch teeth 52. The tooth 70 is shown formed of resilient sheet metal with an axially extending tooth or finger portion 73 received within a slot 76 in the clutch element 30, and with a mounting portion 74 suitably fixed to an outer face 75 of the clutch element 30, as by rivets 77, to provide a resilient support for the tooth portion 73. The tooth portion 73 may accordingly be depressed or withdrawn against the spring force of the mounting portion 74 upon dead center engagement with a tooth 50 of the driving clutch element 16. The tooth portion 73 is formed with a tapered leading edge of generally V-shaped cross section having a radially extending apex 84 that is circumferentially located relative to the apexes 62 of the leading edges of the teeth 52 so as to be irregularly spaced therewith, as best shown in FIG. 5, for which purpose the apex 84 is slightly offset from the center line of the tooth portion 73. Accordingly, if the apexes 62 of the teeth 52 are axially aligned with the apexes of the teeth 50, the axially inclined or tapered edge 85 of the tooth portion 73 will engage one of the tapered leading edge portions 61 of the teeth 50 to angularly displace or cam the clutch elements out of this dead center alignment. If, on the other hand, the apex 84 of the tooth portion 73 is axially aligned for dead center engagement with the apex of a tooth 50, the tooth portion 73 will be axially depressed until the tapered edges 61 of the teeth 50, 52 engage to angularly displace or cam the clutch elements into coacting association and thereby simultaneously cam the tooth portion 73 out of dead center relationship with the clutch element 16.

The clutch mechanism of the present invention also is provided with an interlock, generally denoted by the numeral 100, which is shown adapted for preventing disengagement of the clutch elements 16, 30 while the clutch, and accordingly the counter (not shown) driven thereby, is driven. Also, in conjunction with preventing disengagement of the clutch, the interlock 100 prevents sufficient axial displacement of the reset shaft 12 to reset the counter.

The interlock 100 comprises a first interlock element or plate 102 which is secured within a central bore 104 in the clutch element 16 by suitable fasteners 106 and is accordingly adapted for common rotation with the clutch element 16 coaxially with the shaft 12. A second interlock element 108 is provided with a central hub 110 that is rotatably mounted through a bushing 112 on an extension of the sleeve 32, and the interlock plate 102 is provided with a suitable central opening 114 for receiving the hub 110. A pair of opposed axially extending pins 118, 120 are fixed to the interlock elements 102, 108, respectively, and with their outer ends received within partially circular slots 122, 124 in the other interlock elements, respectively. A coil spring 126 encircling the hub 110 is provided with radially extending ends 128, 130 that engage the pins 118, 120 to bias the interlock elements 102, 108 into a relatively angularly aligned release relationship, as shown in FIG. 1, where the outer ends of the pins 118, 120 are substantially centrally located within the slots 122, 124, respectively, as seen in FIGS. 2 and 3. The central coil of the spring 126 additionally provides for separating the interlock elements as seen in FIG. 1. Thus, it can be seen that the interlock element 108 is a floating element rotatably mounted on the intermediate sleeve 32 and, by the spring 126 is angularly aligned with and axially separated from the interlock element 102.

In the interlock shown, the interlock element 102 is provided with a peripheral axially extending slot 132 and the interlock element 108 is provided with an axially extending lug or projection 134 substantially conforming to the slot 132. When the interlock elements 102, 108 are in angular alignment, as shown in FIGS. 1–3, the slot 132 is positioned to receive the projection 134 to permit relative axial displacement of the interlock element 108 from its position shown in FIG. 1 into coacting association with the interlock element 102. The inner end of the intermediate sleeve 32 is provided with a radial flange 136 and a friction disc or washer 138 is secured to the flange for engagement with a face of the interlock element 108. Accordingly, as the shaft 12 is axially displaced from its fully extended position shown in FIG. 1, the friction disc 138 is moved into engagement with the interlock element 108. Therefore, if the clutch element 16 is rotating, the friction disc 138 will, through frictional engagement with the interlock element 108, angularly displace it out of angular alignment with the interlock element 102 and into engagement with one of the stop pins 139 to lock the interlock element 108 and therefore the shaft 12 against further axial displacement to prevent disengagement of the clutch elements 16, 30 and sufficient axial displacement of the shaft to effect resetting of the counter. Of course, with the clutch stationary, the interlock will remain released and will therefore allow disengagement of the clutch elements 16, 30 and axial displacement of the shaft 12 for resetting the counter.

Referring now to FIGS. 6–13, another embodiment 200 of a clutch mechanism of the present invention is shown fragmentarily with a modified clutch. This clutch comprises a drive clutch element 216 and a driven clutch element 230 having coacting internal and external spline teeth 250, 252, respectively. The driven clutch element 230 has a suitable spur gear 254 fixed thereto for driving the lowest order counter wheel of a counter, and the drive clutch element 216 is provided with a splined hub 218 for mounting a gear for driving the clutch. The clutch additionally comprises an auxiliary clutch element or ring 270 which is shown having internal spline teeth 272 coacting with the external spline teeth 252 of the clutch element 230 and which therefore provide for reciprocably mounting the ring 270 on the clutch element 230. The ring 270 has a full forward position shown in FIG. 7 where it is normally held by a compression coil spring 280 positioned between the gear 254 and a radial flange on the ring 270 and where the leading edges 274 of the spline teeth 272 are positioned forwardly of the leading edges of the spline teeth 252. When, however, the clutch is engaged the ring 270 is depressed or withdrawn against the bias of the compression spring 280 by the clutch element 216 as shown in FIG. 6.

With a spline clutch of the type shown in FIGS. 6–13, a positive fine-tooth clutch having a relatively small angular tooth pitch and a relatively small pitch circle diameter may be readily manufactured by well-known manufacturing methods and, for example, be molded of plastic, as in the shown embodiment. The external spline teeth 252 on the clutch element 230 and the internal spline teeth 250, 272 on the clutch element 216 and ring 270, respectively, are of conforming V-shaped cross section as best seen in FIGS. 8, 10, 12 and 13, and accordingly provide for positive engagement of the clutch elements 216, 230. The spline teeth 250, 252 have leading edges 260 of V-shaped cross section with radially extending apexes 262 and axially inclined or tapered edges 261 in the manner of the embodiment of FIG. 1. These leading edges are therefore adapted to cooperate to angularly displace or cam the clutch elements 216, 230 into cooperative association for engagement of the clutch. The spline teeth 272 of the auxiliary clutch element 270 are provided with similar leading edges of V-shaped cross section; however, as best seen in FIG. 13, the apexes 284 of the leading edges of the spline teeth 274 are angularly offset from the apexes 262 of the leading edges of the internal spline teeth 252 and, with the ring 270 in its full forward or extended position shown in FIG. 7, the tapered edges 285 of the ring teeth overlap the tapered edges 261 of the spline teeth 252 (FIG. 13). The leading edges of the auxiliary spline teeth 274 therefore function in the manner of the leading edges of the auxiliary tooth 70 of the embodiment of FIG. 1 to prevent dead center engagement of the clutch elements. Thus, if the clutch elements 216, 230 are aligned for dead center engagement, the leading edges of the auxiliary clutch element will provide for angularly displacing or camming the clutch elements 216, 230 out of said dead center alignment. On the other hand, if the clutch element 216 and the ring 270 are aligned for dead center engagement, the ring element 270 will be depressed or withdrawn against the bias of the compression spring 280 to allow the leading edges of the spline teeth 250, 252 to cam or angularly displace the clutch elements into cooperative association for engagement of the clutch.

Thus it can be seen that the clutch mechanism of the present invention provides a fine-tooth, positive engagement clutch that can be engaged with minimum angular displacement of the clutch elements. Additionally, the clutch mechanism of the present invention ensures that the clutch is smoothly and easily engaged without dead center engagement of the interfitting clutch elements. Further, the clutch mechanism of the present invention provides an interlock for ensuring that the clutch is not rotating when the clutch is disengaged and provides for driving a counter without slippage, for preventing resetting of the counter when the counter is being driven, and for smoothly re-engaging the counter drive after the resetting is completed with minimum angular error in the drive connection to the counter.

As will be apparent to persons skilled in the art, various modifications and adaptations of the structure above described will become readily apparent without departure from the spirit and scope of the invention, the scope of which is defined in the appended claims.

I claim:

1. In a clutch mechanism comprising a rotary clutch having a pair of coaxial clutch elements relatively axially displaceable for engaging and disengaging the clutch, and an interlock for preventing disengagement of the clutch when the clutch is rotating comprising a pair of interlock elements connected for limited relative angular displacement coaxially with the clutch having an angularly aligned release relationship allowing relative axial displacement of the clutch elements to disengage the clutch and having a nonaligned locking angular relationship providing an interlock preventing said relative axial displacement of the clutch elements to disengage the clutch, means connecting the interlock elements with the clutch elements for relative axial displacement therewith respectively, means urging the interlock elements into said angularly aligned release relationship, and interlock control means operative for relatively angularly displacing the interlock elements into said nonaligned locking relationship and operative for maintaining the interlock elements in said nonaligned locking relationship to prevent disengagement of the clutch while the clutch is rotating.

2. In a clutch mechanism comprising a shaft axially shiftable in opposite axial directions, a rotary clutch having first and second rotatable clutch elements coaxial with the shaft relatively axially displaceable for engaging and disengaging the clutch, said clutch elements having angularly spaced coacting teeth with leading edges of V-shaped cross section engageable for camming the clutch elements into operative association for engagement of the clutch, said clutch being connected for being engaged and disengaged by axially shifting the shaft, and an interlock having a pair of interlock elements mounted for relative rotation coaxially with the clutch elements, said interlock elements having an angularly aligned release relationship for relative axial displacement of the clutch elements to disengage the clutch and having a nonaligned locking angular relationship providing an interlock for preventing said relative axial displacement of the clutch elements to disengage the clutch, one interlock element being connected for rotation with one clutch element and the other interlock element being connected for axial displacement relative to said one interlock element in one axial direction upon disengagement of the clutch, spring means for biasing said other interlock element into angular alignment with said one interlock element, and a nonrotatable friction element coaxial with the clutch connected for axial displacement with the shaft, said friction element being positioned for engagement with said other interlock element for angularly displacing it out of said angularly aligned release relationship with said one interlock element to prevent axial displacement of the shaft in said one axial direction.

3. In a clutch mechanism comprising a rotary clutch having a pair of coaxial clutch elements relatively axially displaceable in opposite axial directions for engaging and disengaging the clutch, and an interlock including a pair of rotary interlock elements coaxial with the clutch having an angularly aligned release relationship for operative engagement and disengagement of the clutch and having a nonaligned angular locking relationship providing an interlock for preventing said relative axial displacement of the clutch elements in at least one axial direction, means connecting the interlock elements with the clutch elements for relative axial displacement therewith respectively, one of said interlock elements being connected for rotation with one of said clutch elements, the other of said interlock elements being a floating element, spring means connecting the interlock elements biasing them into said angularly aligned relationship, and friction means engageable with the floating interlock element for angularly displacing the floating element into nonaligned locking relationship with said one interlock element when said one clutch element is rotating.

4. In a clutch mechanism comprising a rotary clutch having a pair of coaxial clutch elements relatively axially displaceable for operative engagement and disengagement of the clutch, an interlock having a pair of interlock elements connected for limited relative angular displacement coaxially with the clutch, said interlock elements having an angularly aligned release relationship for relative axial displacement of the clutch elements and having a nonaligned locking angular relationship providing an interlock for preventing said relative axial displacement of the clutch elements, means connecting said interlock elements with said clutch elements for relative axial displacement therewith respectively, spring means biasing the interlock elements into said angularly aligned relationship, and means operative upon rotation of at least one of said clutch elements for angularly displacing the interlock elements into said nonaligned locking relationship and operative for maintaining the interlock elements in said nonaligned locking relationship against the bias of the spring means.

5. In a counting device having a shaft axially shiftable for resetting the counting device, a drive clutch and interlock mechanism comprising a rotary drive clutch operatively connected for driving the counting device having drive and driven clutch elements mounted coaxially with the shaft, means for axially shifting one of the clutch elements with the shaft for disengaging and re-engaging the clutch in timely sequence with the resetting of the counting device, first interlock means fixed for rotation with the other clutch element, second interlock means rotatable relative to the first interlock means coaxially therewith, said first and second interlock means having an angularly aligned release relationship for allowing disengagement of the clutch and having a nonaligned locking angular relationship providing an interlock for preventing disengagement of the clutch, spring means connecting the first and second interlock means urging them into said angular aligned relationship, and friction means connected for being axially shifted with the shaft engageable with the second interlock means to angularly displace it into nonaligned locking relationship with the first interlock means when said one clutch element is rotating.

6. In a counter drive, an axially shiftable shaft, a clutch mechanism comprising a rotary clutch mounted coaxially with the shaft, said clutch having driving and driven coaxial clutch elements relatively axially shiftable by the shaft for engagement and disengagement of the clutch, and a control interlock having first and second control elements connected for limited relative angular displacement about the axis of the clutch when in axially separated positions and having means when in angularly aligned positions thereof allowing for relatively axially shifting the control elements into operative association and when out of said angularly aligned positions providing an interlock preventing said relative axial shifting of the control elements into operative association, one of said control elements being fixed for rotation with one of the clutch elements, spring means interposed between the control elements urging them into said angular alignment and into axial separation, and means operative for angularly displacing the control elements out of said angular alignment and operative for maintaining the control elements out of said angular alignment while one of the clutch elements is rotating.

7. In a counting device having a shaft axially shiftable for resetting the counting device, a drive clutch and interlock mechanism comprising a rotary drive clutch operatively connected for driving the counting device having drive and driven clutch elements mounted coaxially with the shaft, means for axially shifting one of the clutch elements with the shaft for disengaging and re-engaging the clutch in timely sequence with the resetting of the counting device, said clutch elements having opposed cooperaing clutch teeth with axially tapered leading edges engageable for camming the opposed teeth into cooperative association for engagement of the clutch, auxiliary tooth means on one of the clutch elements mounted for reciprocable movement from an extended position engageable with the leading edges of the teeth of the other clutch element for angularly displacing the clutch elements out of dead center alignment upon engagement of the clutch, and an interlock having a pair of interlock elements rotatable coaxially with the clutch, said interlock elements having an angularly aligned release relationship for relative axial displacement thereof between disengaged and engaged relative axial positions and having a nonaligned locking angular relationship providing an interlock for preventing said relative axial displacement of the interlock elements, means connecting said interlock elements with said clutch elements for relative axial displacement therewith respectively, means with the interlock elements in their relative disengaged axial positions urging the interlock elements into said angularly aligned relationship, and means operative upon rotation of at least one of said clutch elements and with the interlock elements in their relative disengaged axial positions for angularly displacing the interlock elements into said nonaligned locking angular relationship.

8. In a counter drive, a fine-tooth clutch comprising first and second coaxial clutch elements relatively axially displaceable for engagement and disengagement of the clutch, said clutch elements having inner and outer angularly spaced axially extending spline teeth of generally V-shaped cross section, said spline teeth on the coaxial clutch elements having opposed leading edges with radially extending apexes and of generally V-shaped cross section adapted for camming the inner and outer spline teeth into operative association for engagement of the clutch, and means for angularly displacing the opposed leading edges of the spline teeth out of dead center alignment when the clutch is engaged, comprising an auxiliary ring axially reciprocable on one of said clutch elements coaxially therewith between an extended position and a withdrawn position, said auxiliary ring having spline teeth in operative association with the spline teeth of said one clutch element, said spline teeth on the auxiliary ring having auxiliary leading edges of generally V-shaped cross section engageable with the leading edges of the other of said clutch elements, said auxiliary leading edges having radially extending apexes angularly offset from the apexes of the spline teeth of said one clutch element and said auxiliary leading edges with the auxiliary ring in its extended position overlapping the leading edges of said one clutch element, and spring means urging the auxiliary ring to its extended position.

9. A clutch mechanism comprising a rotary clutch having a pair of coaxial clutch elements relatively axially displaceable for engaging and disengaging the clutch, and an interlock for preventing disengagement of the clutch when the clutch is rotating comprising a pair of interlock elements connected for limited relative angular displacement coaxially with the clutch having an angularly aligned release relationship allowing relative axial displacement of the clutch elements to disengage the clutch and having a nonaligned locking angular relationship providing an interlock preventing said relative axial displacement of the clutch elements to disengage the clutch, means connecting the interlock elements with the clutch elements for relative axial displacement therewith respectively, means urging the interlock elements into said angularly aligned released relationship, and interlock control means operative for relatively angularly displacing the interlock elements into said nonaligned locking relationship and operative for maintaining the interlock elements in said nonaligned locking relationship to prevent disengagement of the clutch while the clutch is rotating, one of said interlock elements being connected for rotation with one of the clutch elements, the interlock control means including a nonrotatable friction element engageable with the other interlock element to frictionally displace it into said nonaligned locking relationship with said one interlock element when said one interlock element is rotating.

10. A clutch comprising first and second coaxial clutch elements relatively axially displaceable for engagement and disengagement of the clutch, said clutch elements having angularly spaced axially extending teeth, said teeth on the coaxial clutch elements having opposed axially tapered leading edges adapted for camming the teeth into angular association for engagement of the clutch, and auxiliary axially extending tooth means with auxiliary axially tapered leading edge means mounted for reciprocable movement on one of the clutch elements between an extended position with its auxiliary leading edge means outwardly of the leading edges of said one clutch element and a withdrawn position with its auxiliary leading edge means inwardly of the leading edges of said one clutch element, means urging the auxiliary tooth means to its extended position, said auxiliary leading edge means being angularly offset from the leading edges of said one clutch element with the auxiliary leading edge means outwardly of the leading edges of said one clutch element for engagement with the tapered leading edges of the other clutch element for camming the opposed leading edges of the clutch elements out of dead center alignment.

11. A clutch comprising first and second coaxial clutch elements relatively axially displaceable for engagement and disengagement of the clutch, said clutch elements having angularly spaced axially extending external and internal cooperating teeth respectively, said teeth on the coaxial clutch elements having opposed axially tapered leading edges adapted for camming the teeth into angular association for engagement of the clutch, an auxiliary ring with axially extending auxiliary teeth with auxiliary axially tapered leading edges, the auxiliary ring being mounted for reciprocable movement on one of the clutch elements between an extended position with its auxiliary leading edges outwardly of the tapered leading edges of said one clutch element and a withdrawn position with its auxiliary leading edges inwardly of the tapered leading edges of said one clutch element, means urging the auxiliary ring to its extended position, said auxiliary leading edges being angularly offset from the tapered leading edges of said one clutch element with the auxiliary edges outwardly of the leading edges of the said one clutch element for engagement with the tapered leading edges of the other clutch element for camming the opposed leading edges of the clutch elements out of dead center alignment.

12. The clutch of claim 11 wherein the auxiliary teeth of the auxiliary ring are in cooperative engagement with the teeth of said one clutch element for mounting the auxiliary ring for reciprocable movement on said one clutch element.

References Cited by the Examiner

UNITED STATES PATENTS

| | | | |
|---|---|---|---|
| 2,821,277 | 1/1958 | Hughes | 192—67 |
| 2,981,390 | 4/1961 | Doerper | 192—67 |
| 3,217,847 | 11/1965 | Petrak | 192—114 X |

DAVID P. WILLIAMOWSKY, *Primary Examiner.*

A. T. McKEON, *Assistant Examiner.*